US009440842B1

(12) United States Patent
Pino

(10) Patent No.: US 9,440,842 B1
(45) Date of Patent: Sep. 13, 2016

(54) CLEANING PRODUCT DISPENSING SYSTEM

(71) Applicant: Henry Pino, Miami, FL (US)

(72) Inventor: Henry Pino, Miami, FL (US)

(73) Assignee: Henry Pino, South Miami, FL (US)

( * ) Notice: Subject to any disclaimer, the term of this patent is extended or adjusted under 35 U.S.C. 154(b) by 0 days.

(21) Appl. No.: 14/623,503

(22) Filed: Feb. 17, 2015

(51) Int. Cl.

| | |
|---|---|
| ***G06K 15/00*** | (2006.01) |
| ***B67D 7/62*** | (2010.01) |
| ***B67D 7/02*** | (2010.01) |
| ***B67D 7/84*** | (2010.01) |
| ***B67D 7/32*** | (2010.01) |
| ***B67D 7/24*** | (2010.01) |

(52) U.S. Cl.
CPC . *B67D 7/62* (2013.01); *B67D 7/02* (2013.01); *B67D 7/243* (2013.01); *B67D 7/3281* (2013.01); *B67D 7/84* (2013.01)

(58) Field of Classification Search
USPC ........................................ 235/381, 383, 375
See application file for complete search history.

(56) References Cited

U.S. PATENT DOCUMENTS

| | | | | |
|---|---|---|---|---|
| 7,066,215 B1 * | 6/2006 | Hewlitt | .................... | B67D 7/74 141/104 |
| 7,611,052 B2 * | 11/2009 | Gosi | ..................... | G07F 13/025 235/378 |
| 2004/0188517 A1 * | 9/2004 | Choi | ....................... | G07F 13/10 235/381 |
| 2006/0261156 A1 * | 11/2006 | Brown | ..................... | B67D 7/02 235/381 |

* cited by examiner

*Primary Examiner* — Ahshik Kim
(74) *Attorney, Agent, or Firm* — Christian Sanchelima; Jesus Sanchelima

(57) ABSTRACT

A cleaning product dispensing machine having compartments where users can refill their used cleaning product containers at convenient locations. The cleaning product dispensing system includes a plurality of cleaning products stored inside the machine. The quantity levels for each product is monitored by float sensors connection to wireless communication equipment capable of notifying the administration of the machines when the amount of a given product is running low or in the case of malfunction. The cleaning dispensing machine is compatible with product cleaner containers of different dimensions and of different types of cleaners.

4 Claims, 16 Drawing Sheets

CLEANING PRODUCT DISPENSING SYSTEM

BACKGROUND OF THE INVENTION

1. Field of the Invention

The present invention relates to cleaning product dispensing system and, more particularly, to a cleaning product dispensing system that is portable and cab ene readily installed in any dwelling to allow users to refill their existing claning product reservoirs.

2. Description of the Related Art

Several designs for dispensing systems have been designed in the past. None of them, however, include an easily transportable dispensing system capable of refilling many different products while wirelessly monitoring the supply levels of each product.

Applicant believes that a related reference corresponds to U.S. patent publication No. US 2010/0072273 issued to Brown for a method and apparatus for vending a containerized liquid product utilizing an automatic self-service refill system. The Brown reference also provides a method of vending fluid product to a customer utilizing an original container. However, it differs from the present invention because the Brown reference requires the reading of a bar code on the container to be refilled so that the apparatus can determine which product to dispense.

Also, the Brown reference requires the mixing of two fluids such as water and concentrate so that the final product can be delivered to the user. This mixing process is cumbersome and can lead to a poor quality delivered product. Also, the Brown reference will not work with any container the user has available. The user must use the container having the bar code of the product he wants refilled. In addition, the bar code has to be in good condition so that the apparatus can read it. The present invention allows the user the flexibility to refill any container with the product of his choosing.

Notably, the Brown reference does not motivate one of ordinary skill in the art to include the float sensor assemblies found in the present invention that are connected to wireless communication to notify a remote computer of the unit's supply levels. Moreover, the Brown reference does not teach of dispensing the product using a control unit that dispenses the product based on serving and viscosity. In addition, the Brown reference does not teach of transportation means such as the slots found in the base of the present invention to readily move the device between locations. Also, the Brown reference does not motivate one of ordinary skill in the art to use a one way valve, or a check valve, that keeps the hoses primed at all times.

Other documents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a dispensing system to be used to refill cleaning product containers, thereby reducing the need for plastic containers and its associated pollution.

It is another object of this invention to provide a dispensing system that allows users to refill their cleaning product containers at a convenient location such as in their apartment building.

It is still another object of the present invention to provide a dispensing system using wireless communication to notify the management when the amount of product in the machine is low. This makes maintaining the machines more efficient than having to visually inspect machines that may not need refilling or risk having a machine go empty which leads to lost profits.

It is another object of the present invention to provide a machine with effective drainage to prevent spillage and maintain the machine in a cleaner condition.

It is still another object of the present invention to provide such a dispensing machine that is compatible with cleaning product containers of different dimensions and of different types of cleaners, including detergent, soaps, cleaners, etc.

It is another object of the present invention to provide a dispensing machine having slots at its base to facilitate the transportation of the machine between locations.

It is another object of the present invention to provide a payment assembly that allows users to effectuate transactions with a plurality of negotiable instruments.

It is yet another object of this invention to provide such a dispensing system that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
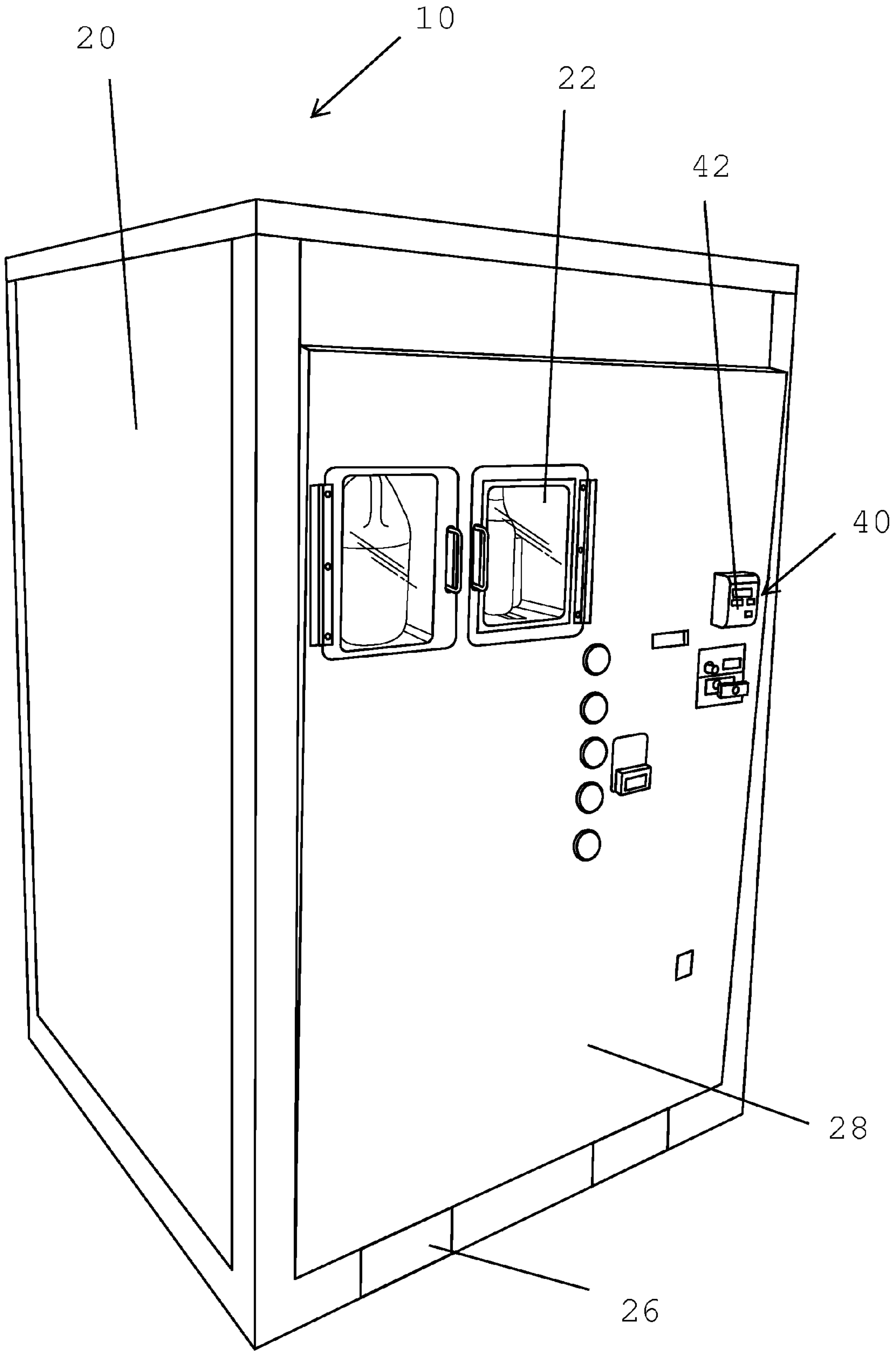
FIG. 1 represents an isometric view showing dispensing machine 20. Transporting slots 26 can be seen at the base of the front of dispensing machine 20.
Figure 2:
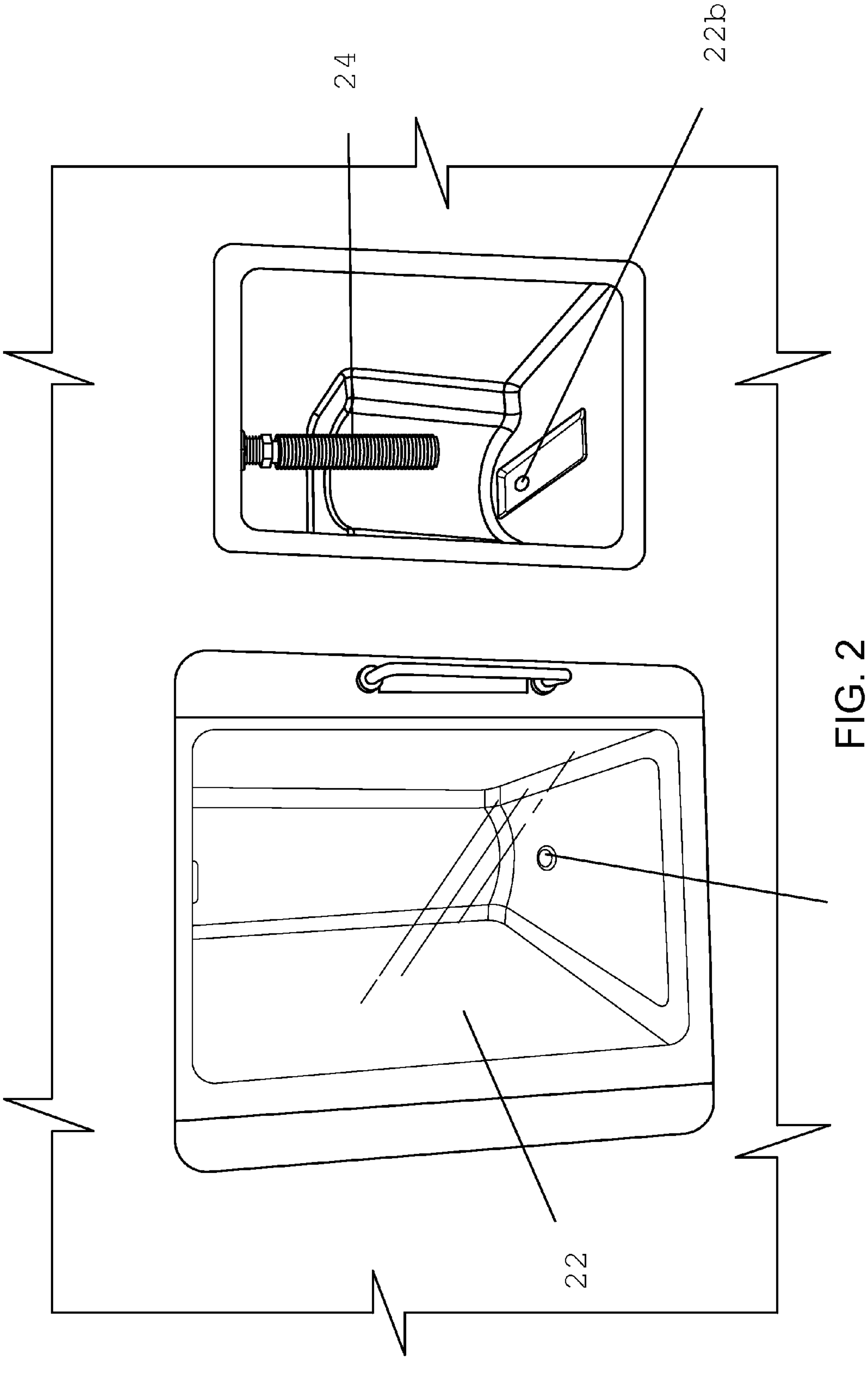
FIG. 2 shows a front elevational view of dispensing machine 20 including dispensing compartments 22.
Figure 2A:
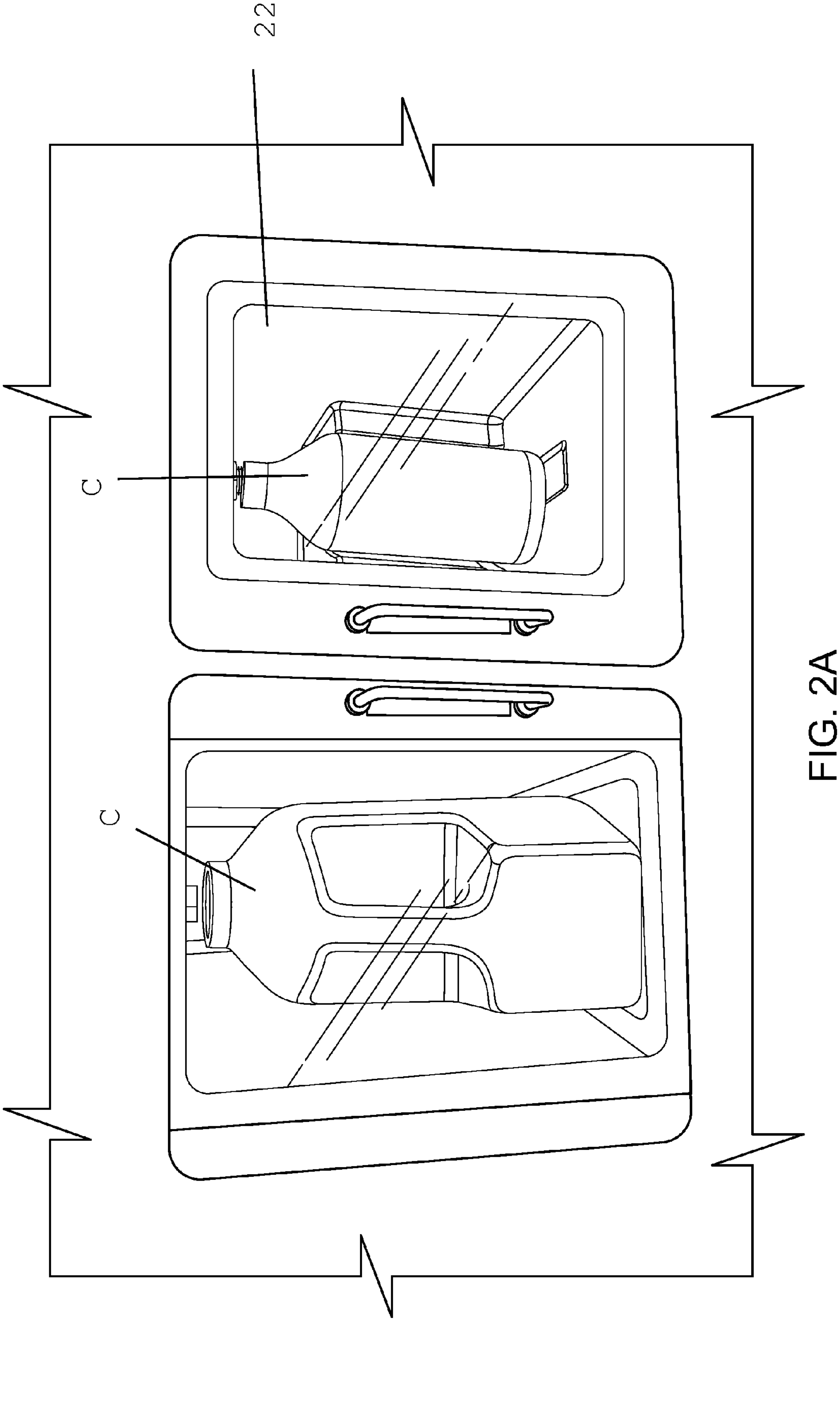
FIG. 2A shows a front elevational view of dispensing machine 20 including dispensing compartments 22 having cleaning containers C ready to be refilled.

Referring now to the drawings, where the present invention is generally referred to with numeral 10, it can be observed that it basically includes dispensing machine 20 being a box-like structure, in a preferred embodiment, as shown in FIG. 1. Dispensing machine 20 further includes dispensing compartments 22 of a predetermined dimension to cooperate with cleaning containers C to be refilled. As seen in FIGS. 2 and 2C, dispensing compartments 22 include drainage holes 22*a*; 22*b* that allow for the drainage of spilled liquids in dispensing compartments 22.

Figure 2B:
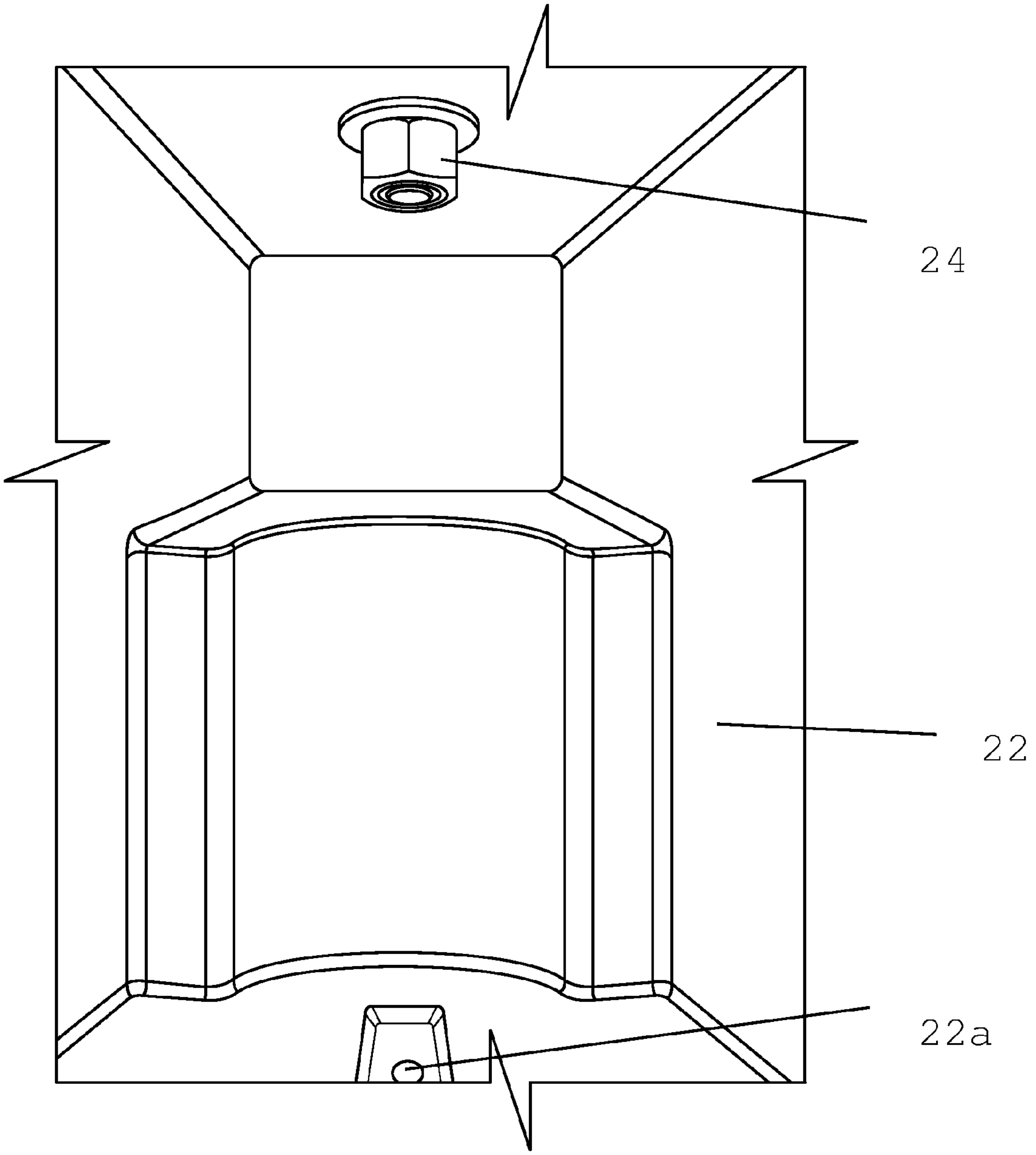
FIG. 2B is an enlarged front elevational view of dispensing compartments 22 showing dispensing nozzle 24 used to dispense liquids into cleaning containers C.
Figure 2C:
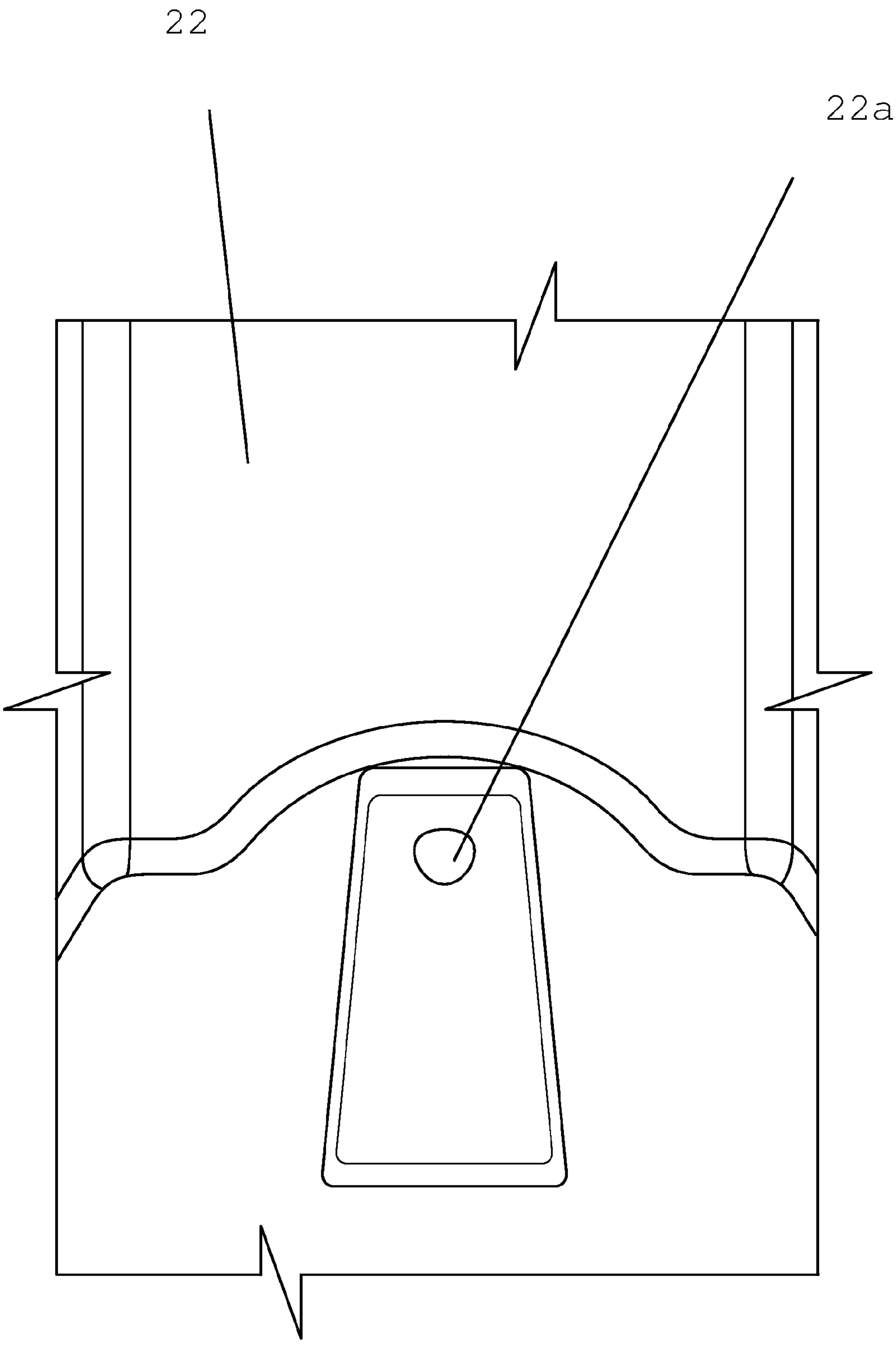
FIG. 2C represents a front elevational view of dispensing compartments 22 wherein drainage hole 22*a* is shown.
Figure 3:
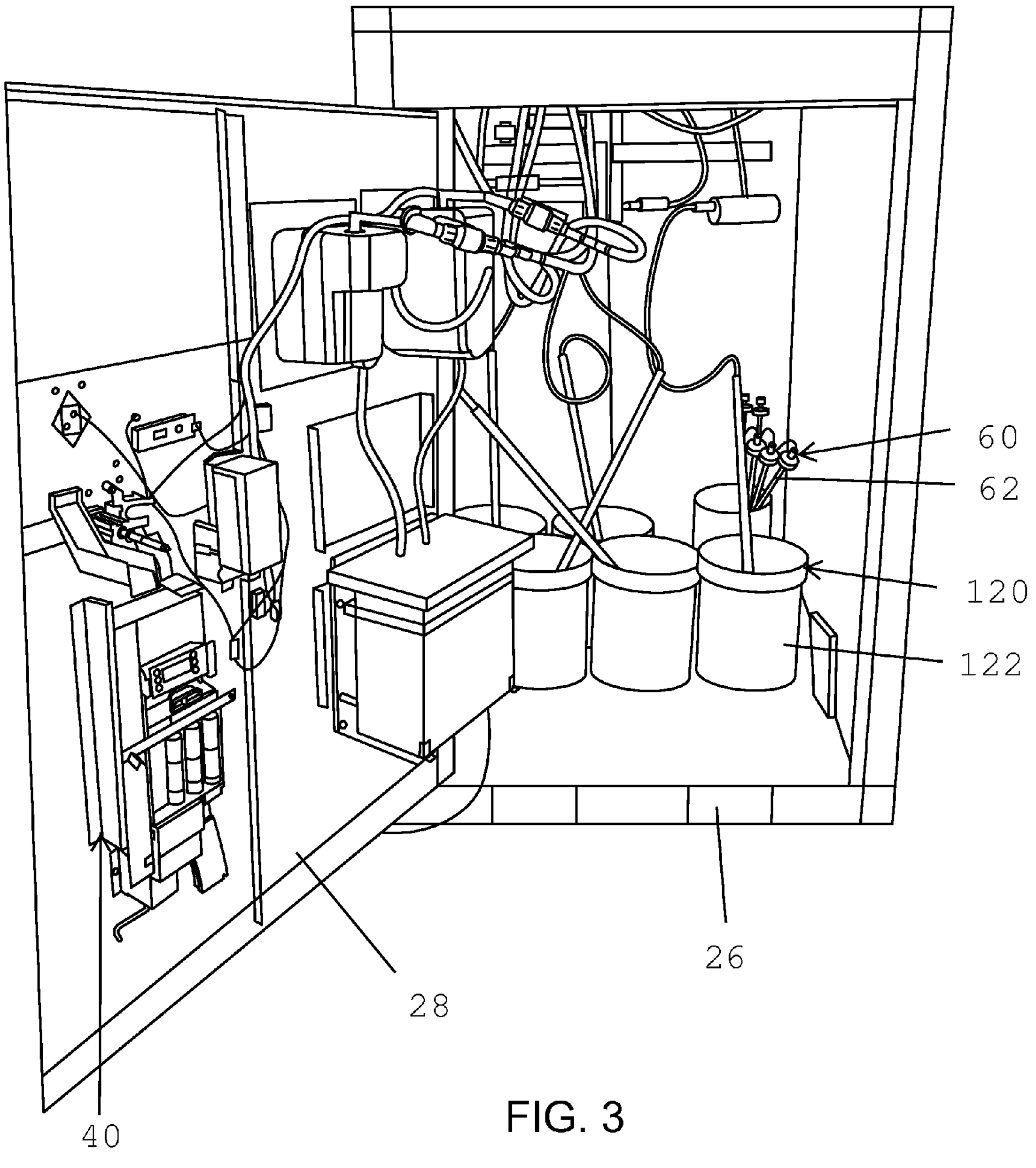
FIG. 3 illustrates an isometric view of the inside of dispensing machine 20 wherein payment assembly 40 is seen mounted to the interior of dispensing machine door 28.

As shown in FIG. 2B, dispensing compartments 22 further include nozzles 24 positioned at a preselected location to effectively dispense liquids into cleaning containers C being refilled. As shown in FIGS. 1 and 3, dispensing machine 20 includes transportation slots 26 used to readily transport the machine. In a preferred embodiment, a forklift can be journaled into transportation slots 26, which serve as a means for lifting and transporting dispensing machine 20.

Figure 3A:
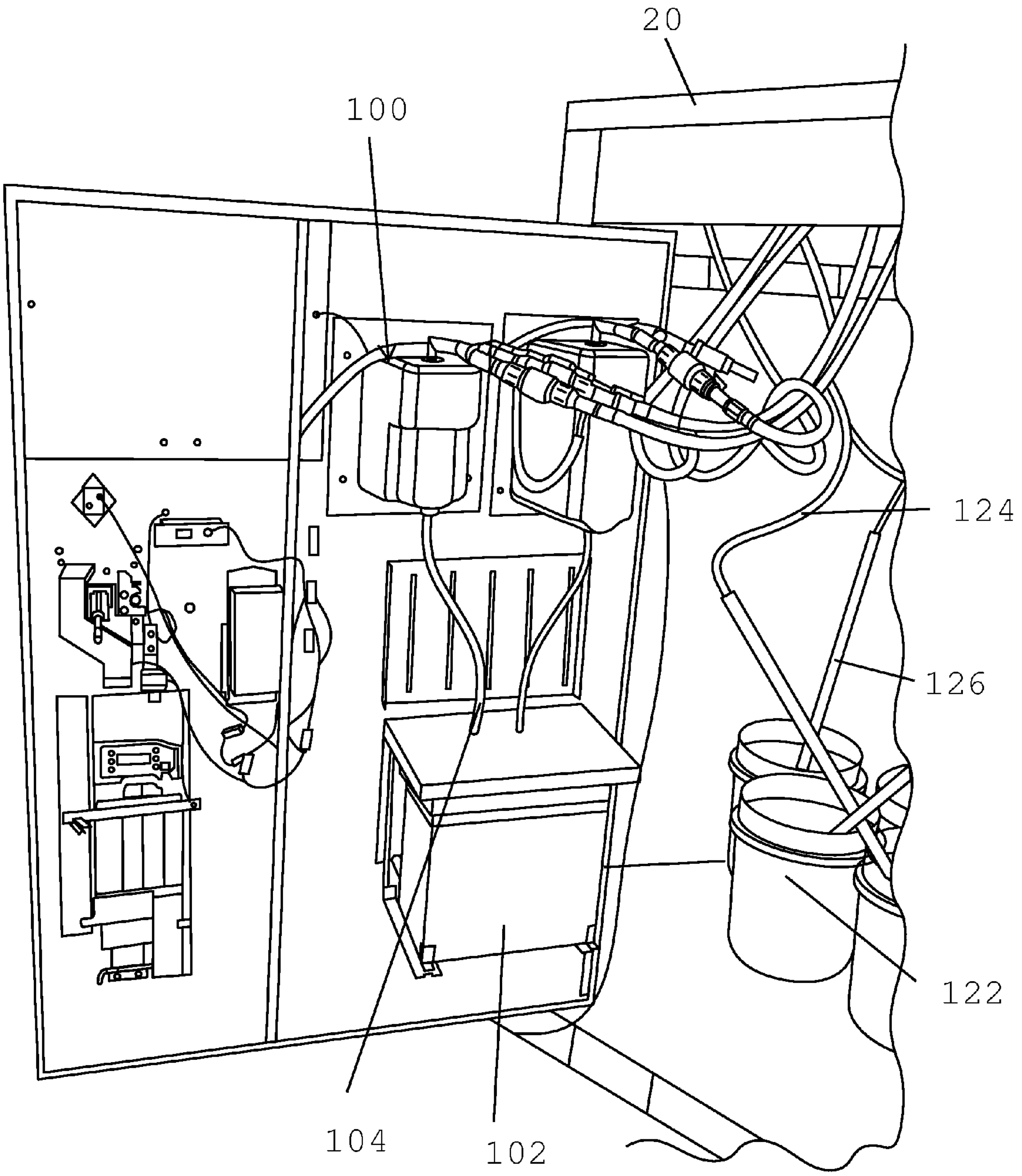
FIG. 3A is a front elevational view of the interior of dispensing machine door 28 showing payment assembly 40, fluid distribution assembly 80, and drainage assembly 120.

Dispensing machine 20 further includes dispensing machine door 28 having payment assembly 40 mounted thereon to receive payments from a plurality of tangible financial instruments, such as cash, credit, or debit cards, as seen in FIGS. 1, 3, and 3A. As seen in FIGS. 1 and 3A, payment assembly 40 includes payment receiver 42 to accept such payments.

Figure 4:
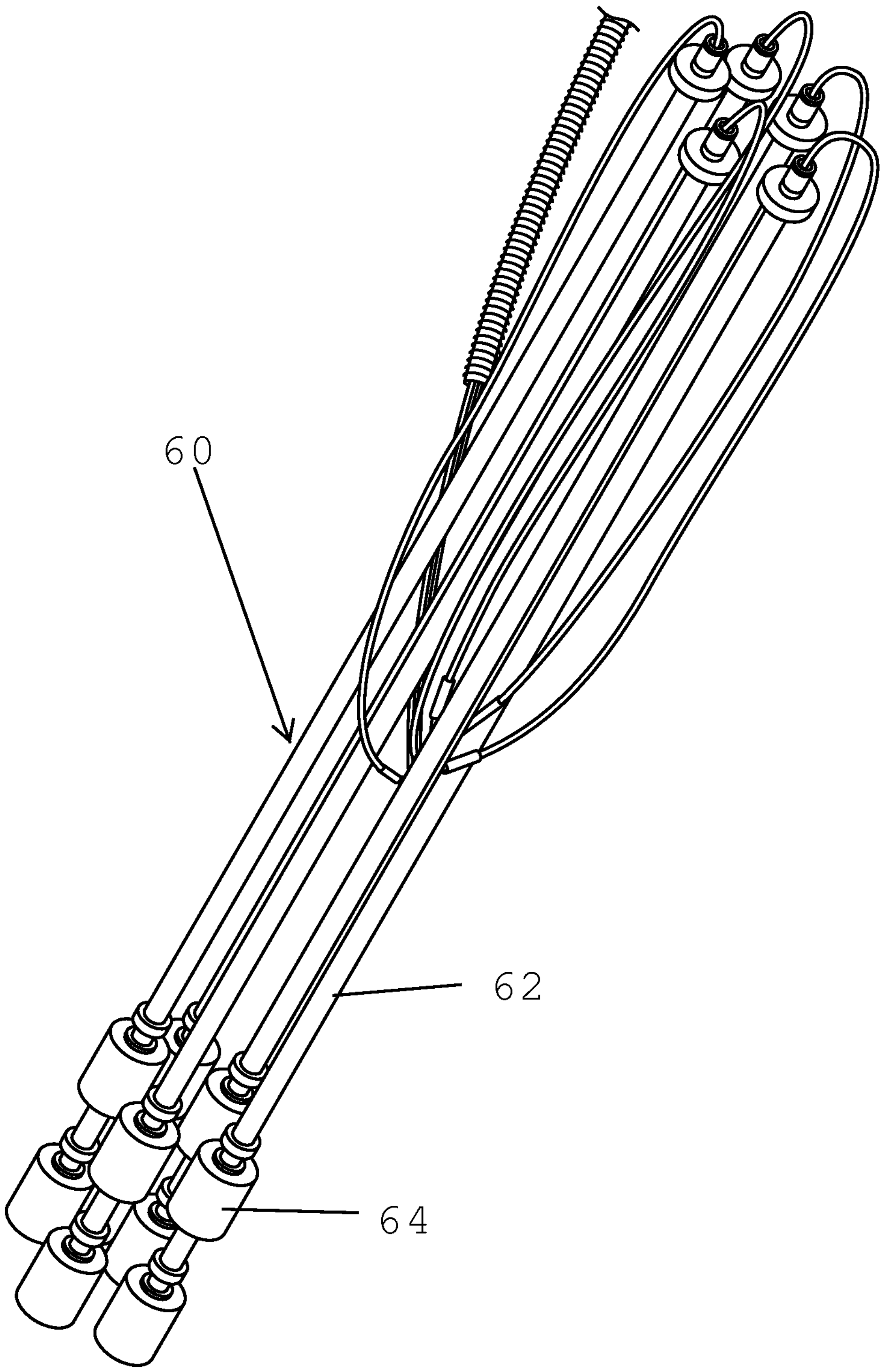
FIG. 4 represents an enlarged view of float sensor assembly 60 that includes float sensor rods 62 having float sensors 64.
Figure 5:
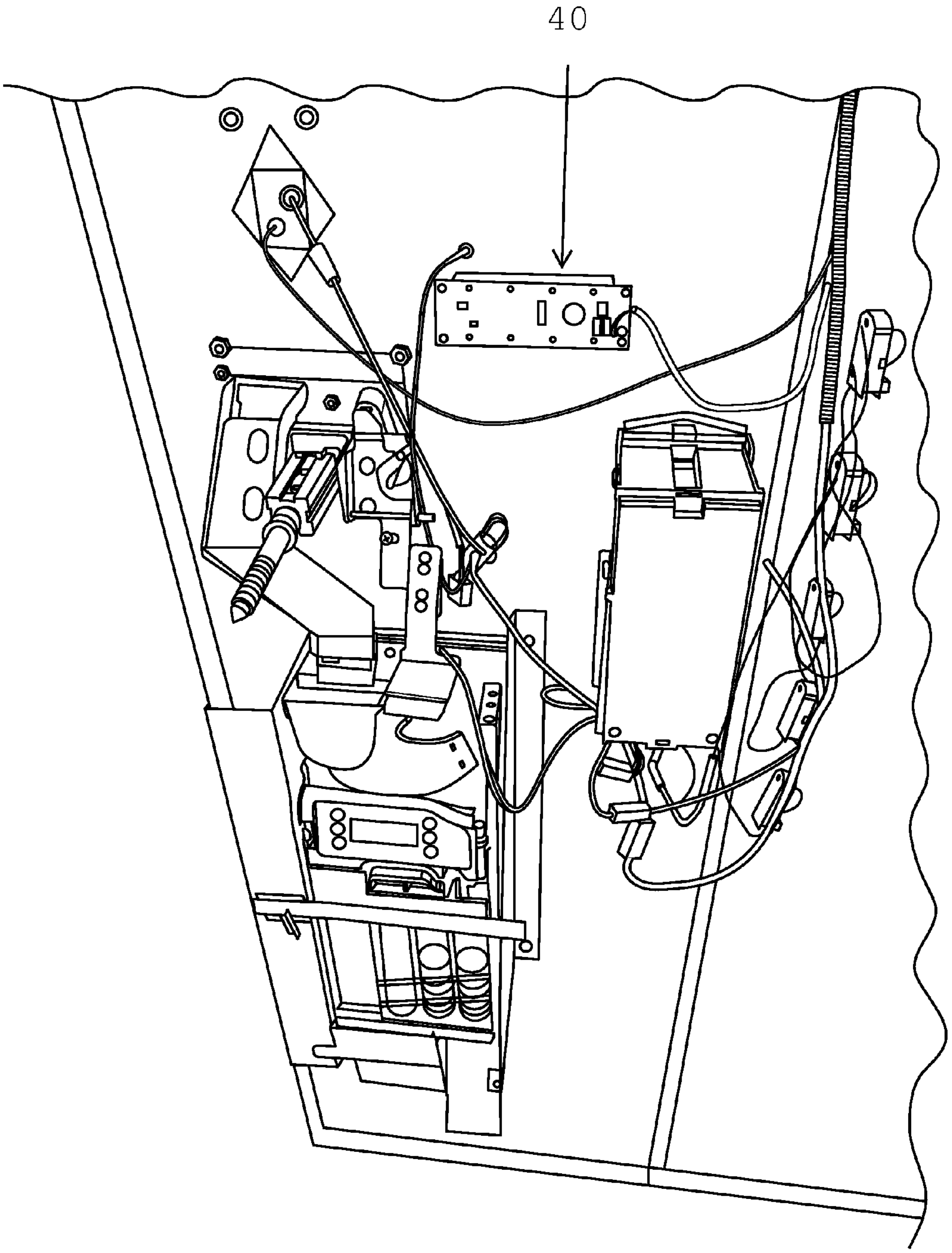
FIG. 5 is a front elevational view of payment assembly 40.

As shown in FIGS. 3 and 4, the interior space of dispensing machine 20 includes float sensor assembly 60 that includes float sensor rods 62 having float sensors 64 to monitor the liquid remaining in supply containers 122 of supply reservoir assembly 120. In addition to float sensor rods 62, supply containers 122 also receive supply hoses 124 that transport the liquid from supply containers 122 to containers C in dispensing compartments 22. Supply hoses 124 are inserted into stabilizing rigid sleeves 126 which provide a predetermined and effective amount of stability to provide efficient flow of the liquid through supply hoses 124.

Figure 6:
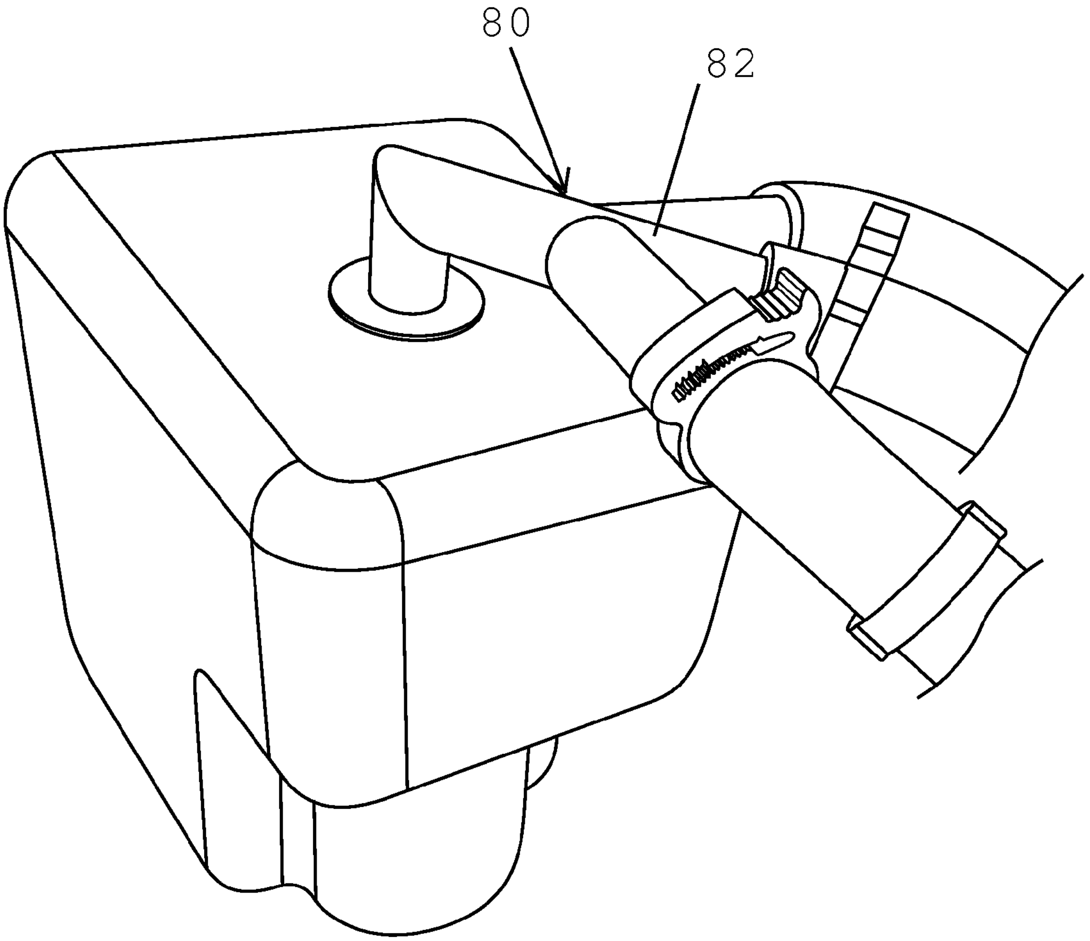
FIG. 6 is an isometric of fluid distribution assembly 80 having three-way valve 82 mounted to back of dispensing compartments 22.
Figure 6A:
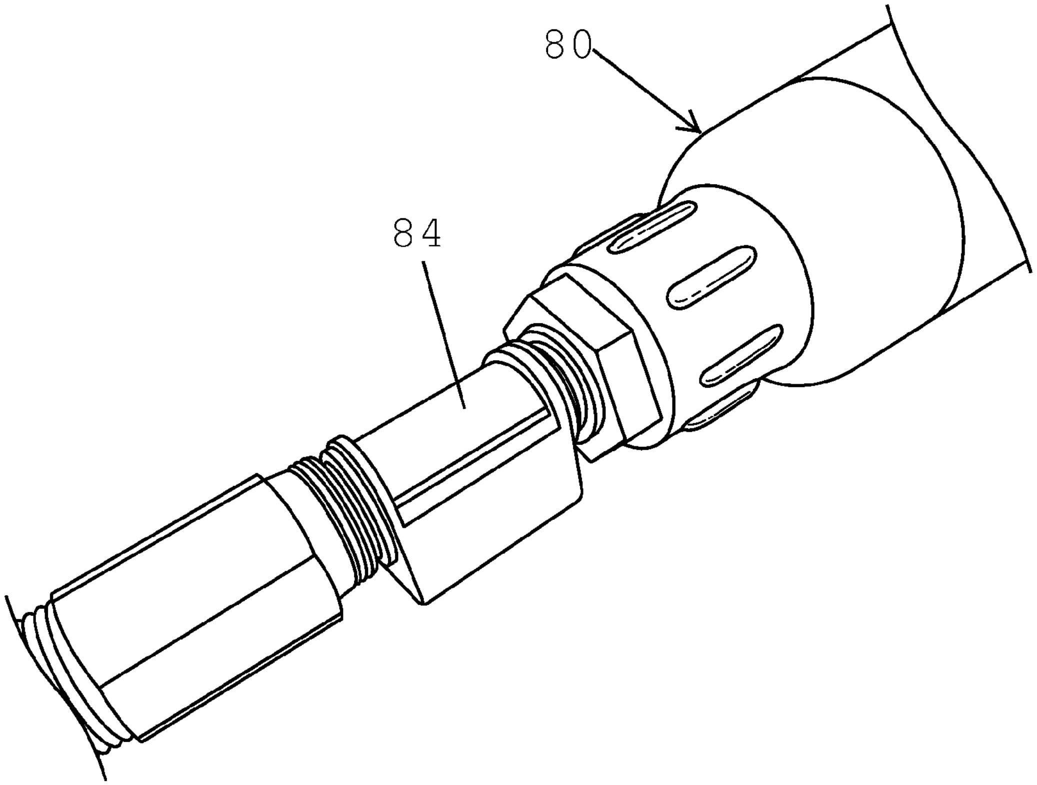
FIG. 6A is an enlarged isometric view of fluid distribution assembly 80 wherein backflow preventers 84 can be seen.
Figure 6B:
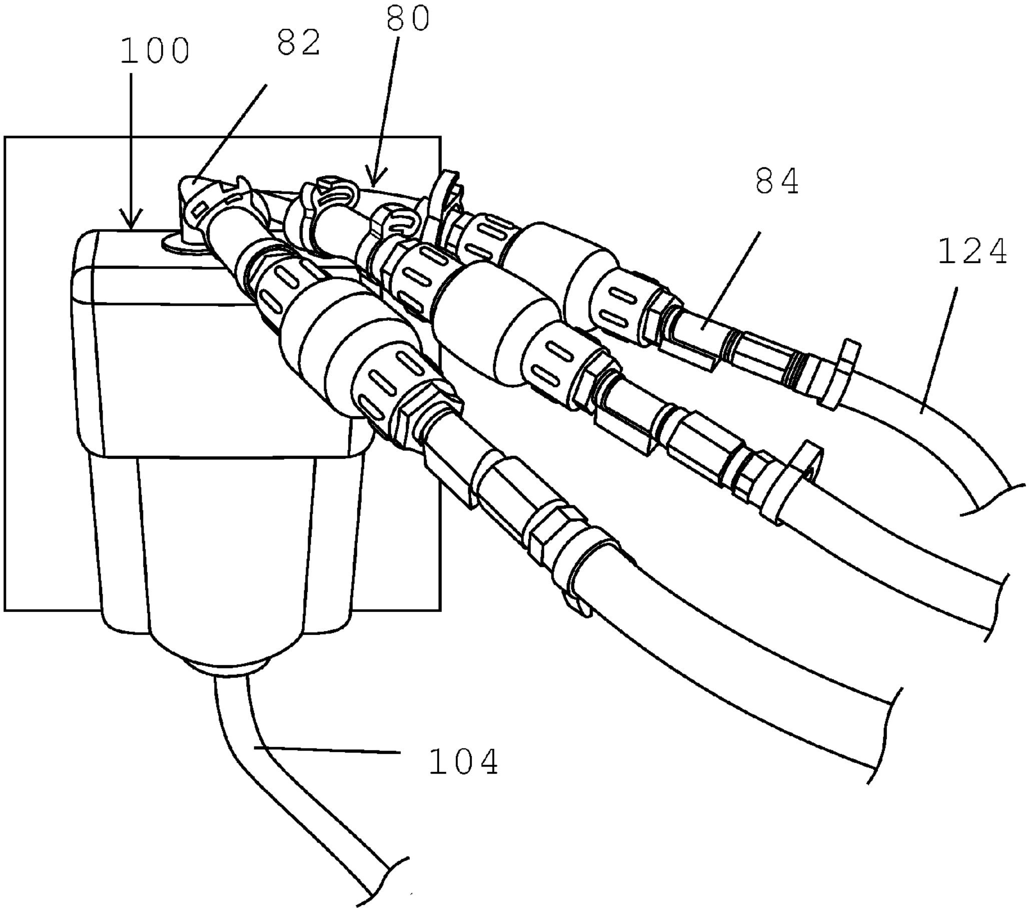
FIG. 6B is an isometric view of distribution assembly 80 shown connected to dispensing compartments 22.
Figure 7:
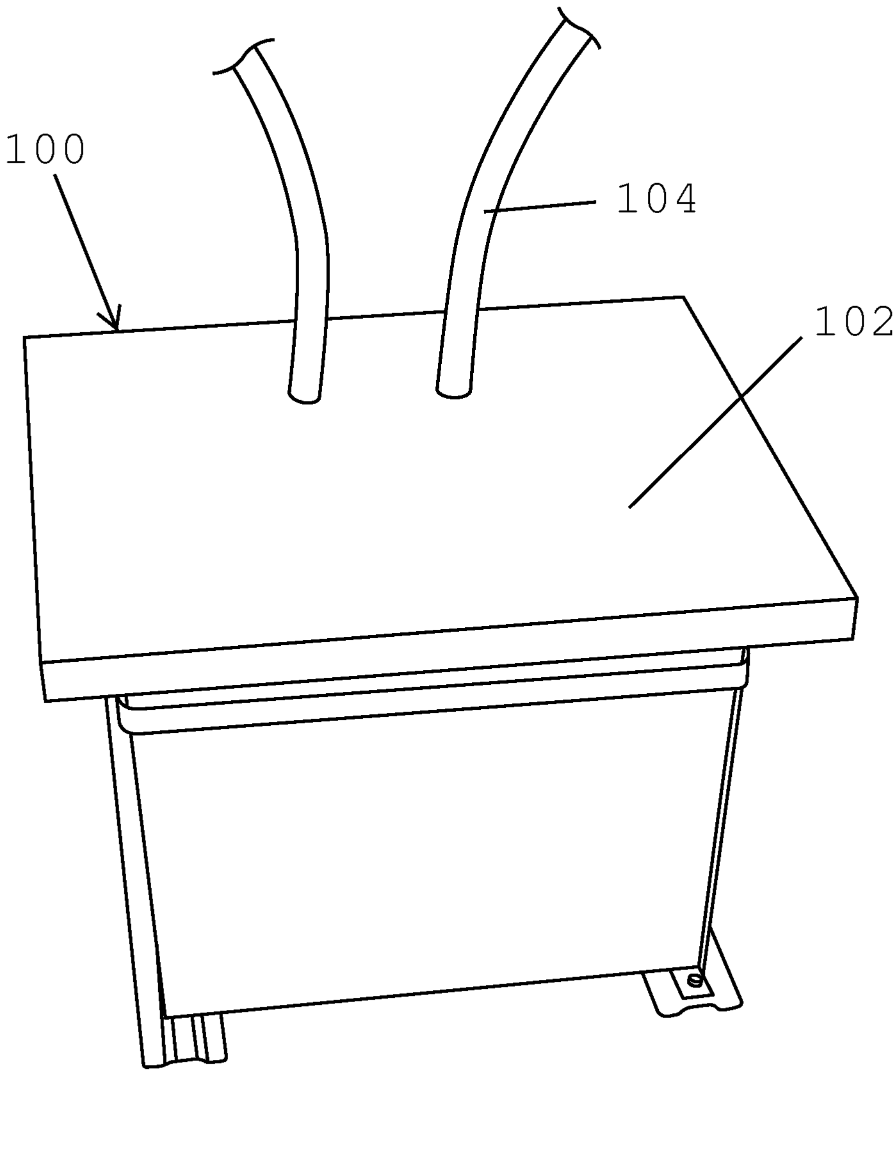
FIG. 7 is an isometric view of drainage assembly 100 having drainage tank 102 connected to drainage holes 22*a*; 22*b* of dispensing compartments 22 using drainage hoses 104.
Figure 8:
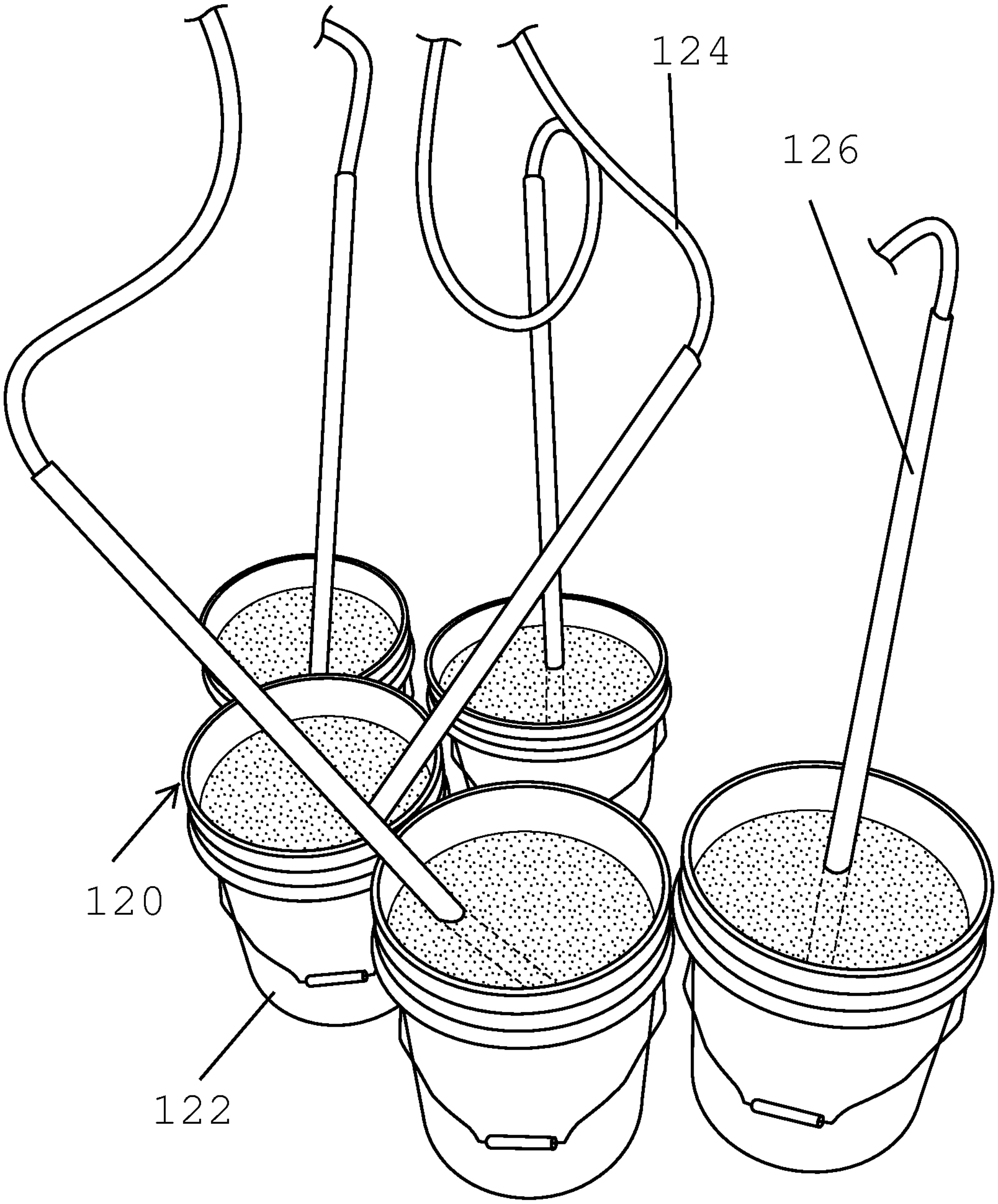
FIG. 8 is an isometric view of supply reservoir assembly 120 having a plurality of containers 122 including supply hoses 124 inserted into containers 122 to collect fluids. Stabilizing rigid sleeves 126 can also be seen around the bottom of supply hoses 124.

As seen in FIG. 3A, drainage assembly 100 includes drainage tank 102 where spilled liquids in dispensing compartments 22 are stored as those liquids drain through drainage holes 22*a* and 22*b* using drainage hoses 104. As shown in FIG. 6B, fluid distribution assembly 80 includes three-way valve 82, which is fed by supply hoses 124. Three-way valve 82 coordinates the liquid that will be dispensed by nozzle 24 from the plurality of supply hoses 124. Fluid distribution assembly 80 can include, as seen in FIGS. 6A and 6B backflow preventer 84 to prevent liquid not sent through nozzle 24 from traveling backwards in the direction of supply reservoirs 122. In a preferred embodiment, supply hoses 124 remain primed at all times to increase the effectiveness and fluid delivery speed of the present invention.

Figure 9:
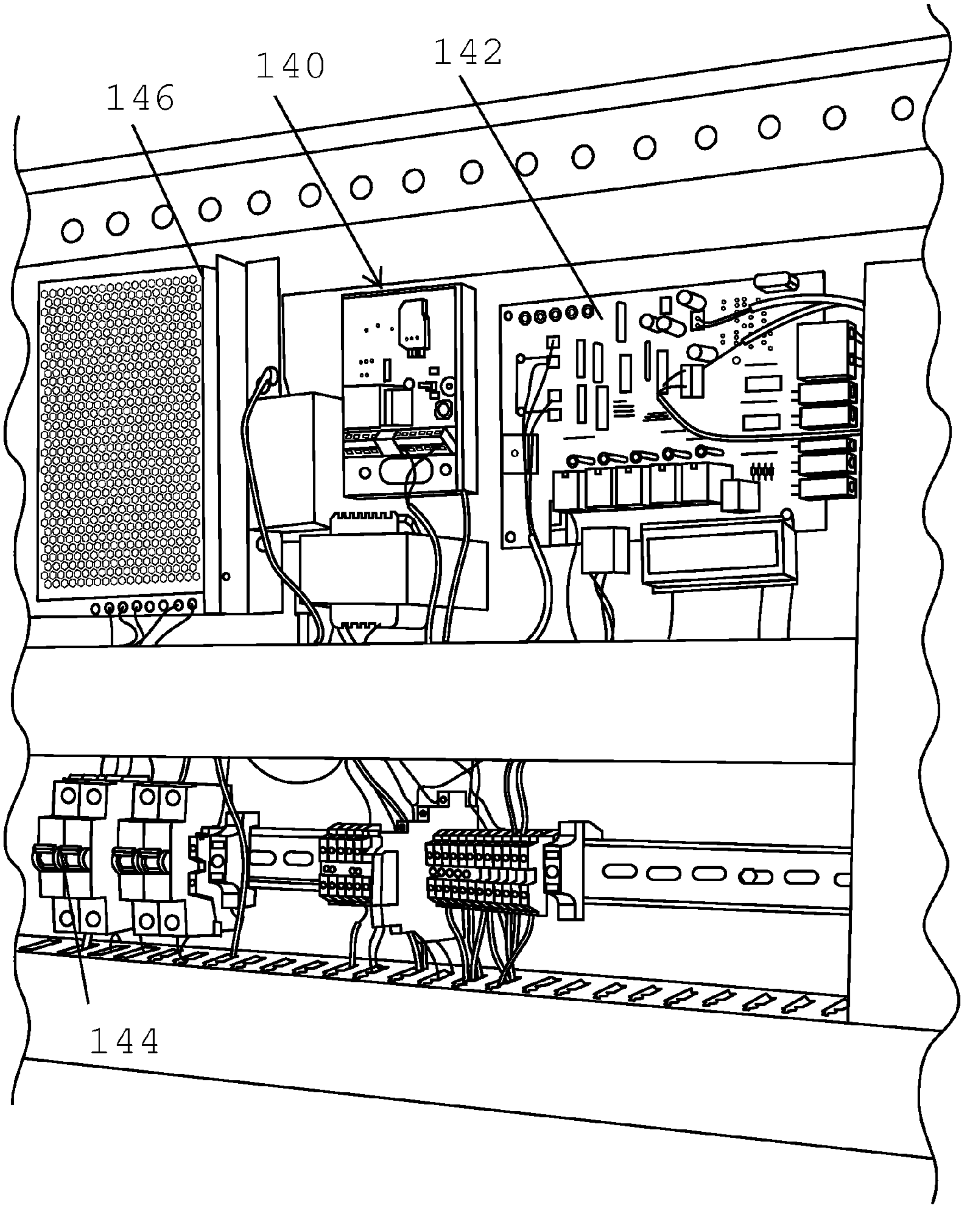
FIG. 9 is a front elevational view of control assembly 140 having motherboard 142, switches 144, and wireless communication means 146.

As seen in FIG. 9, control assembly 140 includes motherboard 142, switches 144, and wireless communication means 146. Control assembly 40 is used to coordinate which liquid will be dispensed based on a user's selection. Wireless communication means 146 can communicate with a remote computerized station using a global computer network to inform an administering user of the supply levels remaining in supply containers 122.

Figure 10:
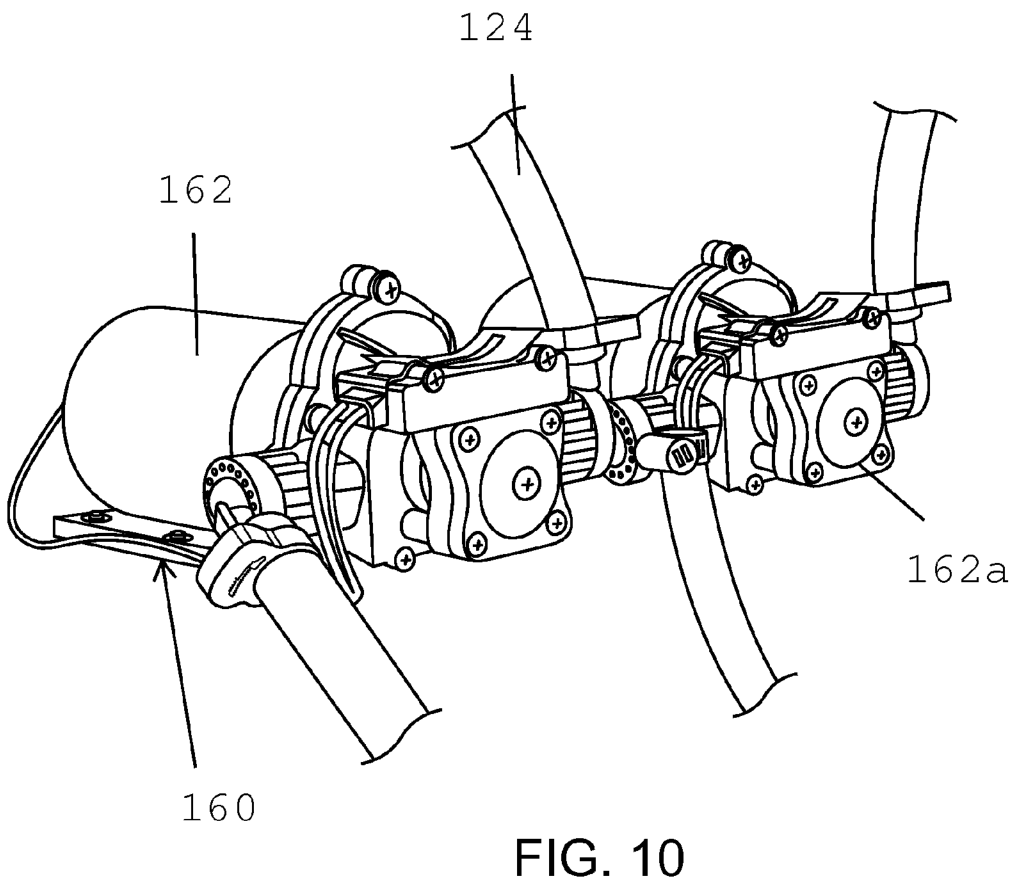
FIG. 10 is an isometric view of pump assembly 160 wherein pumps 162; 162*a* are shown connected to supply hoses 124.

Pump assembly 160 includes pumps 162; 162*a* as shown in FIG. 10. Pumps 162; 162*a* are used to push and keep primed liquids through supply hoses 124 from supply containers 122 until the liquids are dispensed through nozzle 24.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A cleaning product dispensing machine comprising a housing having a door, said door includes at least one compartment on the exterior of said door to cooperate with cleaning product containers of different dimensions, said exterior of said door includes a selection assembly allows a user to select which of said cleaning products to be dispensed, each of said compartments have a dispensing means to dispense said cleaning products, said housing includes a plurality of cleaning product reservoirs storing said cleaning products, said reservoirs connected to said dispensing means using a plurality of hoses, said hoses transporting said cleaning product using pump assemblies to said dispensing means, said reservoirs including a sensor assembly, said sensor assembly connected to a wireless communication assembly that emits a signal notifying a remote station of the supply levels in said cleaning product dispensing machine, said cleaning product dispensing machine further including a control unit that determines which of said cleaning products gets dispensed based on a user's selection from said selection assembly, a payment assembly to process said user's payments, distribution means including check valves that maintain said hoses primed.

2. The cleaning product dispensing machine of claim 1 wherein said hoses of said distribution are mounted to a multi-way valve that directs said cleaning product to said distribution means depending on instructions sent by said control unit.

3. The cleaning product dispensing machine of claim 1 wherein said compartments include a drain connection to a drainage tank using hoses to collect said cleaning product that is spilled or leaks.

4. The cleaning product dispensing machine of claim 1 wherein said housing includes at least one slot so that said cleaning product dispensing machine can be easily transported using transportation means.

* * * * *